(No Model.)
W. W. JACQUES.
Electric Conductor.
No. 240,720.        Patented April 26, 1881.
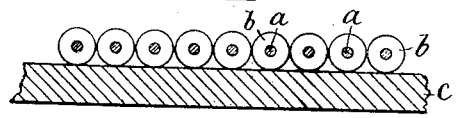
Fig. 1.
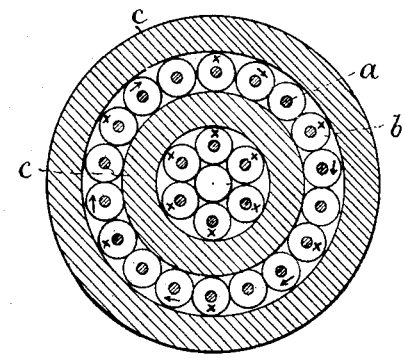
Fig. 2.
Fig. 3
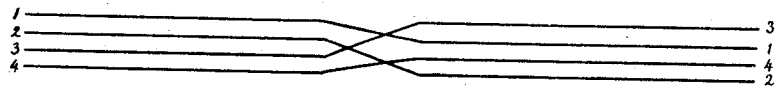
Fig. 4.
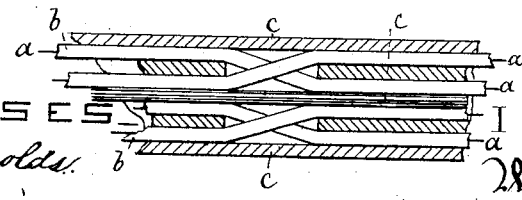
Witnesses
Arthur Reynolds.
Bennie J. Noyes.
Inventor,
William W. Jacques,
by Crosby & Gregory
Attys.

UNITED STATES PATENT OFFICE.

WILLIAM W. JACQUES, OF BOSTON, MASSACHUSETTS.

ELECTRIC CONDUCTOR.

SPECIFICATION forming part of Letters Patent No. 240,720, dated April 26, 1881.

Application filed February 16, 1881. (No model.)

*To all whom it may concern:*

Be it known that I, WILLIAM W. JACQUES, of Boston, county of Suffolk, State of Massachusetts, have invented an Improvement in Electric Conductors, of which the following description, in connection with the accompanying drawings, is a specification.

My invention relates to electric conductors, and has for its object to prevent the inductive action between the different conductors of a series lying adjacent to one another.

In another application I have shown and described a cable containing a series of independent insulated conductors having conducting material filling the interstices between them, to divert the inductive effects produced by currents in one of the said conductors from the other conductors of the series.

My present invention consists in placing a conductive body, of considerable size relative to the size of the wires, close to the insulating-coating of a series of insulated conductors laid side by side, so that the electric impulses in any one of the said lines will expend their energy on the said conducting-body rather than on the other lines of the series.

It also consists in a novel method of arranging the wires when laid, so that no pair of wires shall remain next to one another for the entire distance that they traverse together.

Figure 1 is a cross-section of a series of conductors embodying my invention; Fig. 2, a modification thereof; Fig. 3, a diagram illustrating a series of wires arranged in accordance with my invention; and Fig. 4, a longitudinal section of a portion of a cable like that shown in Fig. 2, also illustrating the arrangement of the wires.

The conducting-wires $a$, each provided with a covering, $b$, of insulating material, are laid side by side upon a sheet or strip of conducting material, $c$, which may be lead or iron, or any other suitable material, and is in contact with the insulating-coatings of the said wires.

It will be seen that the distance between any one of the wires $a$ and the conducting-body $c$ is equal to the thickness of the insulating-coating $b$, while the distance between two neighboring wires is equal to the added thickness of both their coatings.

As the effect produced by induction in a conducting-body is proportional to its proximity to the inducing-current, and as of two conductors in equal proximity the one of greater conductivity will absorb the greater portion of the inductive effect, it will be seen that the main portion of the energy derived from a current passing through one of the conductors $a$ will be expended upon the conductor $c$ rather than upon the neighboring conductors $a$.

If desired, another series of conductors may be placed on the other side of the conductor $c$, Fig. 1, which would then prevent inductive action from passing from the conductors on one side to those on the other side, as well as preventing most of the inductive action between the different conductors on the same side, as just described.

When desired, the conductor $c$, with its series of insulated conductors $a\,b$, may be rolled up or made in a tubular form, as shown in Fig. 2, when the external conductor, $c$, will serve also to protect the insulated conductors $a\,b$ from injury. Several concentric series of insulated conductors $a\,b$, separated by tubular conductors $c$, may be employed to form a compact cable, in which case the conductors $c$ on either side of a given insulating-conductor $a\,b$ will both co-operate to divert the inductive effect of any of the wires $a$ from its neighbors. There may still be some inductive action between the different conductors $a$, and as this action is almost entirely confined to the wires next to the one through which the inducing-current is passing, the effect produced thereby may be diminished by changing the relative position of the conductors $a$ from point to point, as shown in Fig. 3, so that no two remain in immediate juxtaposition for the entire distance. When connected as shown in Fig. 3, the wire 1 will exert its inductive action chiefly upon the wire 2 for only a part of the distance, after which it is transferred to a position between the wires 3 and 4, so that for the remaining part of the distance it has but little effect on the wire 2. The same is true of each of the four wires shown in Fig. 3, and where a large number of wires is included in one cable, as shown in Figs. 2 and 4, their relative position can be greatly varied, so that no two will be in the closest proximity to one another for more than a small part of the entire distance, they being also interchanged from one to another of the concentric layers, as shown in Fig. 4. For instance, when there are six conductors in the middle series and eighteen in the next outer series, as shown in Fig. 2, the following change might be made at a point about one-fourth the entire distance from one end of the cable—namely, the six middle wires might be interchanged with the six outer wires having the same mark, ×, while the six outer wires, marked →, might each be moved past two wires to the right, each one then occupying the place previously filled by the one removed at its right. A similar change might be made with the wires thus arranged at the middle and three-fourth points in the cable, so that each of the wires would have traversed only one-fourth the whole distance by the side of any other individual wire included in the cable.

The conductor $c$, Fig. 1, may be made with a series of parallel grooves in which to lay the insulated conductors $a\ b$, and when the form shown in Fig. 2 is employed the interstices between the insulating-coverings $b$ and the conductors $c$ may be filled with a liquid or other conducting material. The conductors $c$ will have to be connected with the ground at or near their ends, and preferably, also, from point to point throughout their length whenever convenient. They may be made of such material as to serve to strengthen the cable, if necessary.

I claim—

1. A series of electric conductors, each provided with a covering of insulating material and laid side by side, combined with a strip of conducting material of considerable size relatively to the size of the conductors, lying adjacent to the insulating-coverings of the said conductors, whereby the inductive effect of electric impulses in one of the conductors of the series is diverted from the others, substantially as described.

2. In an electric cable, a series of concentric layers of independent insulated conductors, combined with tubes of conducting material interposed between the said layers, whereby inductive disturbances are diverted from the insulated conductors, substantially as described.

3. In an electric cable, two or more concentric series of independent electric conductors, arranged as described, the single continuous conductors being located in different series in different portions of their length, substantially as and for the purpose set forth.

In testimony whereof I have signed my name to this specification in the presence of two subscribing witnesses.

WILLIAM W. JACQUES.

Witnesses:
Jos. P. Livermore,
L. F. Connor.